(12) United States Patent
Zack et al.

(10) Patent No.: US 11,009,586 B2
(45) Date of Patent: May 18, 2021

(54) MOBILE CALIBRATION APPARATUS FOR VEHICLE SENSORS

(71) Applicants: Bosch Automotive Service Solutions Inc., Warren, MI (US); Robert Bosch GmbH, Stuttgart (DE)

(72) Inventors: Steven Zack, Essex, CT (US); Daniel Newkirk, Owatonna, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 209 days.

(21) Appl. No.: 16/113,096

(22) Filed: Aug. 27, 2018

(65) Prior Publication Data

US 2019/0064320 A1 Feb. 28, 2019

Related U.S. Application Data

(60) Provisional application No. 62/552,421, filed on Aug. 31, 2017.

(51) Int. Cl.
| *G01S 7/40* | (2006.01) |
| *G01S 7/52* | (2006.01) |
| *G01S 7/497* | (2006.01) |
| *G01S 17/88* | (2006.01) |
| *G01S 13/931* | (2020.01) |

(52) U.S. Cl.
CPC .............. *G01S 7/40* (2013.01); *G01S 7/497* (2013.01); *G01S 7/4972* (2013.01); *G01S 7/52004* (2013.01); *G01S 7/4026* (2013.01); *G01S 17/88* (2013.01); *G01S 2007/403* (2013.01); *G01S 2007/4034* (2013.01); *G01S 2013/93271* (2020.01)

(58) Field of Classification Search
CPC .............. G01S 17/88; G01S 2007/403; G01S 2007/4034; G01S 2013/93271; G01S 7/40; G01S 7/4026; G01S 7/497; G01S 7/4972; G01S 7/52004; G01S 13/931; G01S 15/931; G01S 17/936; G01S 2013/9385
USPC ............. 73/1.79; 702/104; 348/47; 342/165; 356/139.09
See application file for complete search history.

(56) References Cited

U.S. PATENT DOCUMENTS

| 3,363,504 A | 1/1968 | Lill et al. |
| 4,142,299 A | 3/1979 | Alsina |
| 4,331,347 A | 5/1982 | Madden |
| 4,338,027 A | 7/1982 | Eck |
| 5,088,754 A | 2/1992 | Skelton |

(Continued)

FOREIGN PATENT DOCUMENTS

EP 2416139 A1 2/2012

*Primary Examiner* — John Fitzgerald
*Assistant Examiner* — Truong D Phan
(74) *Attorney, Agent, or Firm* — David Kovacek; Maginot, Moore & Beck LLP

(57) ABSTRACT

A mobile sensor calibration apparatus that is operable to be mounted to the side of a service vehicle to perform calibrations outside of a workshop environment. The mobile sensor calibration apparatus may further comprise platform members to provide an even surface for a subject vehicle having sensors needing calibration. In some embodiments, the mobile sensor calibration apparatus may be compacted and stored in the service vehicle during transportation.

19 Claims, 6 Drawing Sheets

(56) References Cited

U.S. PATENT DOCUMENTS

| | | | |
|---|---|---|---|
| 5,125,164 A * | 6/1992 | Fournier | G01B 11/27 |
| | | | 33/228 |
| 5,473,931 A * | 12/1995 | Brady | G01B 11/022 |
| | | | 340/937 |
| 6,460,004 B2 | 10/2002 | Greer et al. | |
| 6,542,840 B2 | 4/2003 | Okamoto et al. | |
| 7,237,344 B2 | 7/2007 | Shishikura | |
| 7,877,884 B2 | 2/2011 | Harrill et al. | |
| 8,904,653 B1 | 12/2014 | Miaskiewicz | |
| 9,279,670 B2 * | 3/2016 | Schommer | G01S 7/52004 |
| 2005/0096807 A1 * | 5/2005 | Murray | G01S 7/4026 |
| | | | 33/288 |
| 2008/0030710 A1 * | 2/2008 | Oshima | G01S 7/003 |
| | | | 356/4.01 |
| 2009/0045011 A1 * | 2/2009 | Niemela | B66F 11/044 |
| | | | 182/51 |
| 2013/0166134 A1 * | 6/2013 | Shitamoto | G05D 1/0223 |
| | | | 701/26 |
| 2015/0317781 A1 | 11/2015 | Napier et al. | |
| 2017/0003141 A1 | 1/2017 | Voeller et al. | |

* cited by examiner

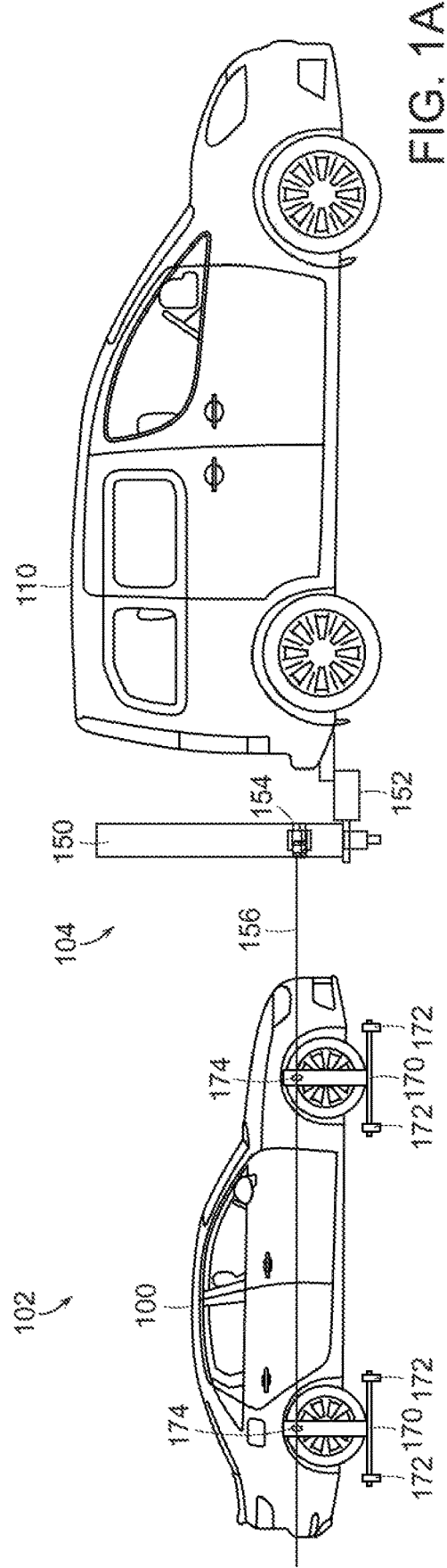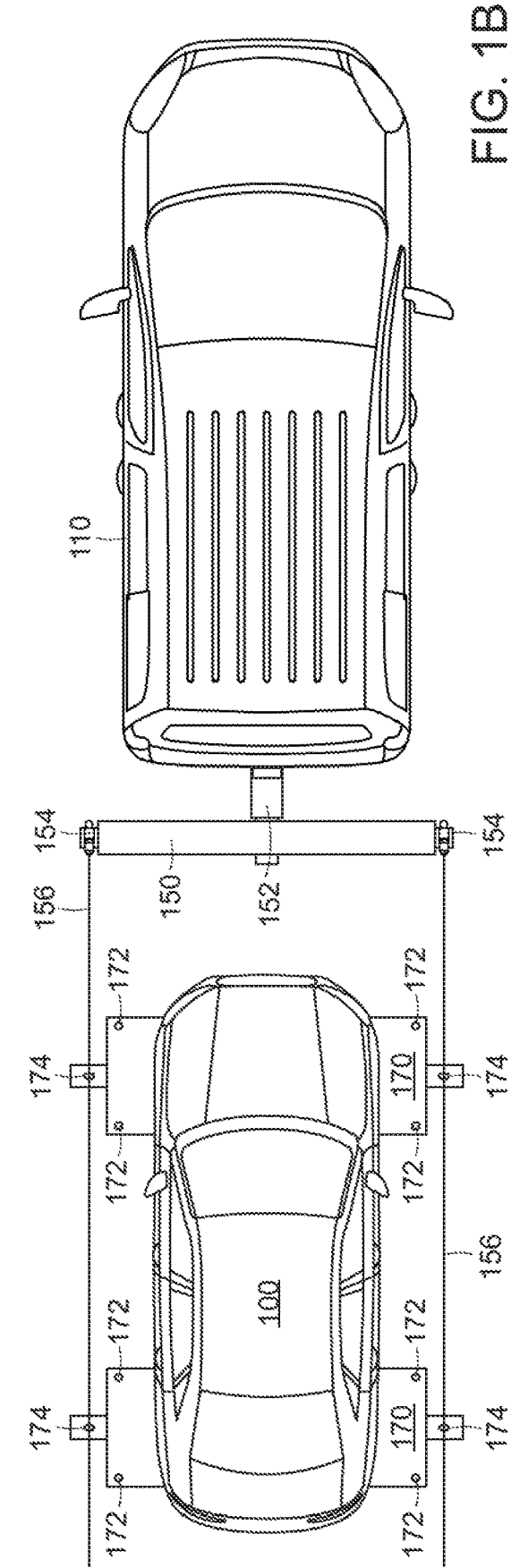

MOBILE CALIBRATION APPARATUS FOR VEHICLE SENSORS

TECHNICAL FIELD

This disclosure relates to the calibration of sensors, and in particular sensors using radar, optical, or sonic signals disposed within a vehicle for use with an Advanced Driver Assistance System.

BACKGROUND

In vehicles having an Advance Driver Assistance System, the associated sensors require calibration to achieve proper operation. Calibration may be required as part of regular maintenance, or on particular occasions such as the repair or replacement of the windshield or other glass components of the vehicle. Certain vehicular glass repairs may be completed on-site, such as at the vehicle owner's home or place of business. Current calibration tools are typically bulky and stationary, and require the vehicle to be brought into an automotive service center or similar controlled environment. It is therefore desirable to have a calibration apparatus that is sufficiently mobile that the calibration procedure may be performed at a desired location outside of an automotive service center. It is additionally desirable to make use of such a calibration apparatus to preserve a maximum amount of space in small facilities, and to optimize the existing space of a facility.

SUMMARY

One aspect of this disclosure is directed to a portable calibration apparatus that is advantageously foldable or compactable for storage or transport. The mobility of the portable calibration apparatus may be increased further by mounting it to a mobile support, such as a work vehicle. In some embodiments of this aspect, the mounting of the portable calibration device may be accomplished using a three-point hitch. In some such embodiments, the three-point hitch may comprise components to adjust the configuration of the portable calibration apparatus while mounted to the mobile support.

Another aspect of this disclosure is directed to the utilization of a number of electric motors configured to improve the accuracy and repeatability of the placement and alignment of a portable calibration apparatus.

A further aspect of this disclosure is directed to the control of the adjustment process of a portable calibration apparatus using an interface of a controller configured to operate electric motors configured to operate the placement and alignment of the portable calibration apparatus. In some embodiments of the aspect, the adjustment of the portable calibration apparatus is accomplished using a telescoping mechanism. In some such embodiments, the telescoping mechanism comprises a threaded cavity and threaded screw mechanism.

And yet a further aspect of this disclosure is directed to a mobile system for vehicle sensor calibration, the mobile system comprising a number of platforms operable to provide a level surface for a subject vehicle, a mobile support structure, a folding reference structure configured to be mounted onto the mobile support structure, and a support vehicle. In some embodiments of the aspect, the support vehicle comprises the mobile support structure. In some embodiments of the aspect, the folding reference structure is configured to be folded using a number of motors. In some such embodiments, the motors may be controlled via a user interface.

The above aspects of this disclosure and other aspects will be explained in greater detail below with reference to the attached drawings.

BRIEF DESCRIPTION OF THE DRAWINGS

FIG. 1a is a side-view illustration of an embodiment of a mobile calibration apparatus during a calibration setup.

FIG. 1b is a top-view illustration of the embodiment of FIG. 1a.

DETAILED DESCRIPTION

Figure 2:
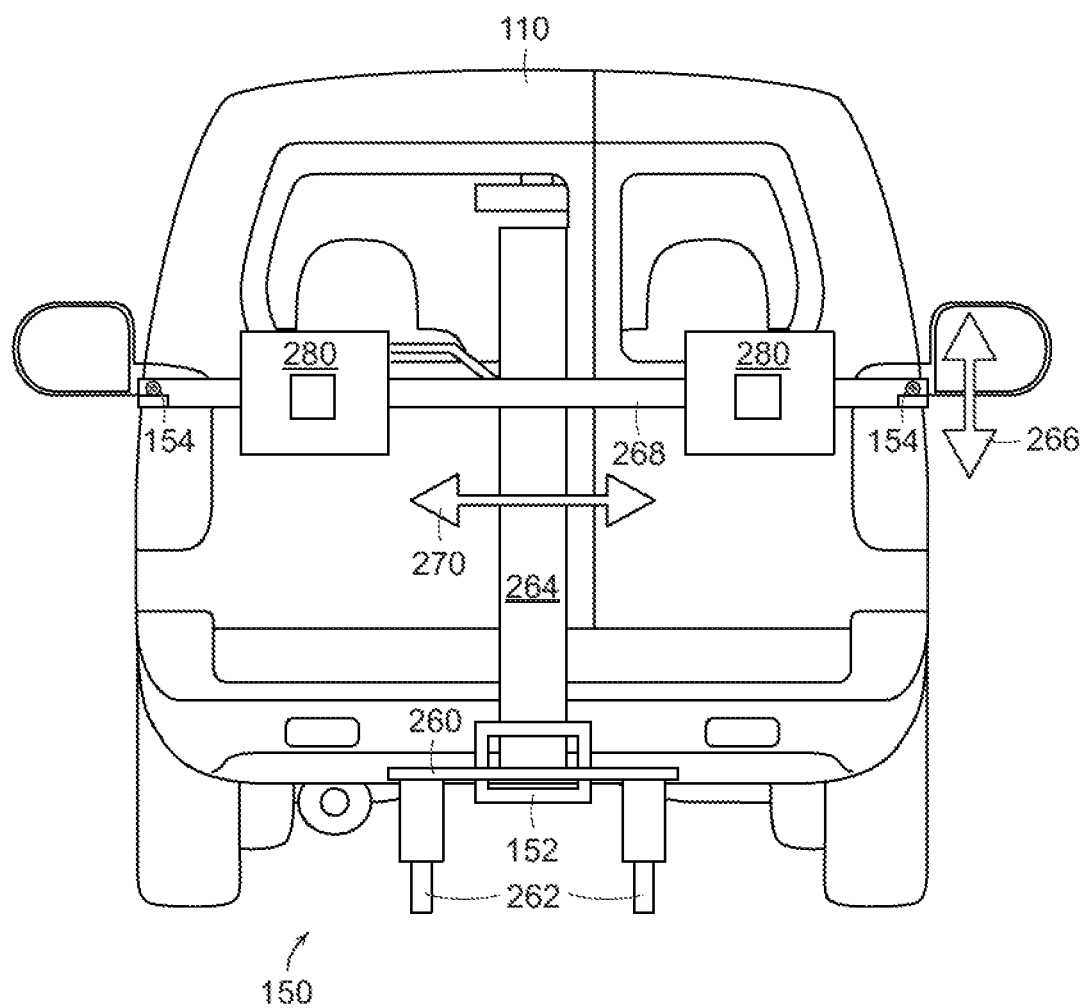
FIG. 2 is a mid-view of the mobile calibration apparatus from the perspective of a vehicle's forward-facing sensor during the setup of calibration depicted in FIG. 1.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

FIGS. 1a and 1b depict an embodiment of a mobile calibration system 102 for sensors of a subject vehicle 100. In the depicted embodiment, the sensors (not shown) of the subject vehicle 100 are forward-facing, but other configurations may be embodied without deviating from the invention herein. In the depicted embodiment, the sensors of vehicle 100 are radar sensors, but other alternative embodiments may include camera sensors, LIDAR sensors, optical sensors, sonic sensors, or any other directional sensors known to one of ordinary skill in the art.

The system 102 comprises a mobile calibration apparatus 104 integrated with a service vehicle 110, which additionally provides support elements with respect to components of the mobile calibration apparatus. The mobile calibration apparatus 104 comprises a primary member 150 which is shown mounted to service vehicle 110 using hitch mechanism 152. In the embodiment depicted, hitch mechanism 152 is operable to support mounting of the primary member 150 to the rear of service vehicle 110, but other configurations are contemplated, such as mounting to the side of service vehicle 110. Hitch mechanism 152 may be configured to support a permanent or detachable mounting of primary member 150, and thus mounting to the front of service vehicle 110 is also achievable. In embodiments wherein primary member 150 may be detachably mounted, service vehicle 110 may be advantageously operable to store primary member 150 such that the calibration system, is mobile using service vehicle 110.

Calibration of the sensors of subject vehicle 100 requires proper placement and angle of the primary member 150 with respect to the sensors. Thus, a number of measuring instruments 154 are coupled to the primary member 150 and utilized to position the service vehicle 110 at desired distance and angle to the sensors of subject vehicle 100. A number, as used herein, means one or more. In the depicted embodiment, measuring instruments 154 are detachably coupled to primary member 150, but in some embodiments measuring instruments 154 may be permanently coupled to primary member 150. In the depicted embodiment, measuring instruments 154 comprise optical range-finders having digital leveling capabilities, but other configurations are contemplated such as measuring tapes, spirit levels, sonic range-finders, or any other alternative configuration known to one of ordinary skill in the art. The particular distance and angles for calibration of the sensors of subject vehicle 100 are determined by the particular specification of the sensors of subject vehicle 100. Measuring instruments 154 are operable to support the position and angle of service vehicle 110 with respect to subject vehicle 100 using a number of measurement vectors 156 determined using measuring instruments 154. In the depicted embodiment, measurement vectors 156 comprise optical vectors emitted by the measuring instruments 154, but in any configuration measurement vectors 156 represent the proper distance and measurement angles of the service vehicle 110 with respect to the subject vehicle 100.

The mobile calibration system is intended to be operable in a field-service capacity, and thus is operable in environments that may be less ideal than automotive workshop conditions. If calibration is to be performed on uneven surfaces, the mobile calibration apparatus may additionally comprise a number of platform members 170. Platform members 170 provide a level platform surface with height-adjustable foot structures to provide a sufficiently-level surface to operably perform calibration of the sensors of subject vehicle 100. Thus, platform members 170 have sufficient strength to support the weight of subject vehicle 100. The desired height and evenness of platform members 170 is achieved using height-adjustable foot structures 172. In the depicted embodiment, height-adjustable foot structures 172 comprise screw-threaded foot structures, but other embodiments may be utilized without deviating from the teachings herein, such as hydraulic lifts, motorized telescoping rods, or any other equivalent configurations known to one of ordinary skill in the art. In the depicted embodiment, measurement of the desired height and evenness of platform members 170 is achieved using measurement targets 174 with measuring instruments 154 coupled to primary member 150. Other embodiments may achieve these results using other configurations, such as additional measurement instruments operably coupled to platform members 170. In some embodiments, platform members 170 may be stored within service vehicle 110 such that the calibration system is mobile using service vehicle 110.

FIG. 2 depicts primary member 150 of the mobile calibration apparatus 104 (see FIG. 1a) while mounted on service vehicle 110 via hitch mechanism 152. Primary member 150 comprises a base 260 which is coupled to hitch mechanism 152. Base 260 additionally comprises a number of stabilizers 262 which further support primary member 150 by providing stability of primary member 150 with respect to service vehicle 110 and also the ground. In the depicted embodiment, stabilizers 262 comprise hydraulic jacks, but other embodiments may comprise other configurations without deviating from the teachings herein. Extending from base 260 is a first adjustable support 264. First adjustable support 264 extends from the base 260 in a substantially-vertical direction 266. The degree of extension of first adjustable support 264 in substantially-vertical direction 266 may be advantageously controlled to suit the specified calibration requirements of the sensors of subject vehicle 100.

Extending from first adjustable support 264 is a second adjustable support 268, which extends in a substantially-horizontal direction 270. In the depicted embodiment, the extension of second adjustable support 268 may be controlled such that second adjustable support 268 remains centered with respect to first adjustable support 264. Other embodiments may comprise substantially-horizontal extension of second adjustable support 268 such that it does not remain centered with respect to first adjustable support 264.

Second adjustable support 268 additionally provides mounts for other elements of the mobile calibration apparatus, such as measurement instruments 154 and also a number of reflective targets 280. Reflective targets 280 provide reflective surfaces to be targeted by the sensors of subject vehicle 100 during calibration. The dimensions of reflective targets 280 are determined by the specifications of the sensors of subject vehicle 100. In the depicted embodiment, reflective targets 280 may be detachably coupled to second adjustable support 268, though in other embodiments reflective targets 280 may be permanently coupled thereto.

Figure 3:
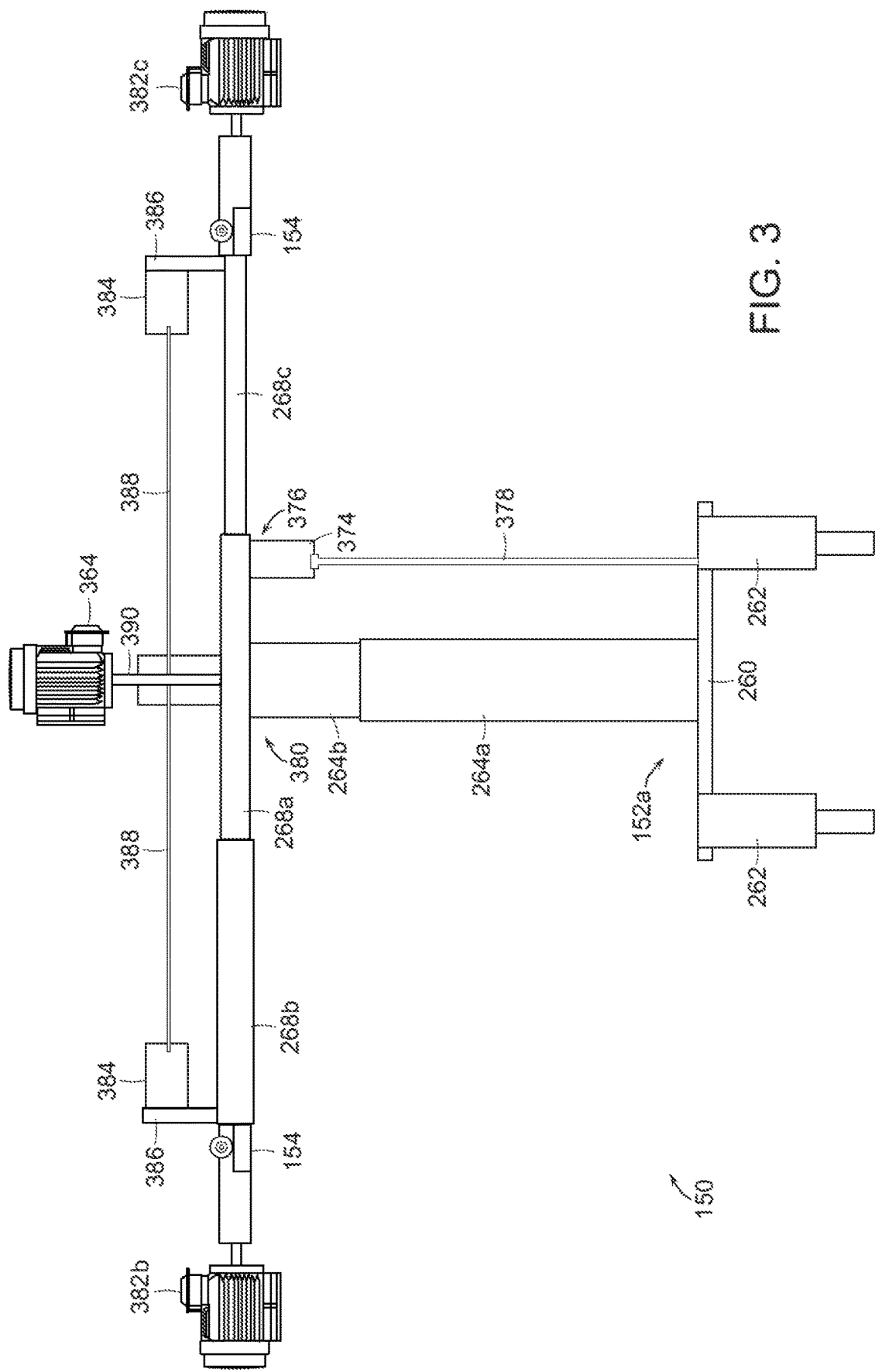
FIG. 3 is a diagrammatic illustration of a primary member of a mobile calibration apparatus.

FIG. 3 is a diagrammatic illustration of a primary member 150. In this depicted embodiment, first adjustable support 264 is comprised of two segments, lower segment 264a and upper segment 264b. Lower segment 264a extends from base 260, and upper segment 264b extends therefrom in a substantially-vertical direction. The degree of extension of upper segment 264b may be controlled using a vertical adjustment mechanism 364. Though the depicted embodiment comprises a single vertical adjustment mechanism 364, other embodiments may comprise a plurality. In one embodiment, vertical adjustment mechanism 364 may be embodied as an electric motor configured to control the degree of extension of upper segment 264a from lower segment 264a. In other embodiments, vertical adjustment mechanism 364 may be embodied using a manual mechanism, a hydraulic mechanism, or any other alternative embodiment known to one of ordinary skill in the art. Adjustment of the first adjustable support 264 may be aided by a vertical extension instrument 374, depicted herein as mounted to first adjustable support 264 via a vertical instrument mount 376.

Vertical extension instrument 374 determines a vertical extension vector 378 as a measurement of the distance and angle of the first adjustable support 264 from base 260. In the depicted embodiment, vertical extension instrument 374 is an optical range-finder, but other embodiments are contemplated without deviating from the teachings herein, including a tape measure, sonic range-finder, or any other alternative equivalent known to one of ordinary skill in the art. In the depicted embodiment, vertical extension instrument 374 is configured to be detachably coupled to first adjustable support 264, but in some embodiments may be permanently affixed thereto. In some embodiments, vertical extension instrument 374 may be a reconfiguration of one or more of measuring instruments 154, such as an alternative mounting angle or an alternative detachably coupling placement with respect to first adjustable support 264. In embodiments wherein vertical extension instrument 374 may be detachably coupled to primary member 150, service vehicle 110 may further be operable to provide storage for vertical extension instrument 374, for example during transport of the mobile calibration apparatus.

In the depicted embodiment, second adjustable support 268 is comprised of three segments, center segment 268*a*, left-hand segment 268*b*, and right-hand segment 268*c*. Center segment 268*a* is coupled to first adjustable support 264 using a coupling mechanism 380. In the depicted environment, coupling mechanism 382 comprises a weld, but other equivalent embodiments may be used without deviating from the teachings herein, such as a bolt fastener, interlocking apparatus, clipping mechanism, cable tie, or any other alternative embodiment recognized by one of ordinary skill in the art. Center segment 268*a* extends substantially-horizontally from coupling mechanism 380 in a static position. Left-hand segment 268*b* additionally extends substantially-horizontally from center segment 268*a* to the left to an adjustable degree. Right-hand segment 268*c* extends substantially-horizontally from center segment 268*a* to the right to an adjustable degree. The degree of extension of left-hand segment 268*b* and right-hand segment 268*c* may be controlled using a number of horizontal adjustment mechanisms 382*b* and 382*c* respectively. Though this embodiment comprises two horizontal adjustment mechanisms 382*b* and 382*c*, other embodiments may comprise a single horizontal adjustment mechanism 382, or a larger plurality. In one embodiment, horizontal adjustment mechanism 382 may be embodied as an electric motor configured to control the degree of extension of left-hand segment 268*b* and right-hand segment 268*c* from center segment 268*a*. In other embodiments, horizontal adjustment mechanism 382 may be embodied using a manual mechanism, a hydraulic mechanism, or any other alternative embodiment known to one of ordinary skill in the art. Adjustment of the second adjustable support 268 may be aided by a number of horizontal extension instruments 384, depicted herein as mounted to second adjustable support 268 via a horizontal instrument mount 386. In the depicted embodiment, horizontal extension instruments 384 comprise a plurality of instruments, but other embodiments may comprise a single instrument or a greater plurality.

Horizontal extension instrument 384 determines a horizontal extension vector 388 as a measurement of the distance and angle of the extension of second adjustable support 268 from the coupling mechanism 380. In the depicted embodiment, horizontal extension instrument 384 comprises an optical range-finder and horizontal extension vector 388 is represented by a laser line measurement, but other embodiments are contemplated without deviating from the teachings herein, including a tape measure, sonic range-finder, or any other alternative equivalent known to one of ordinary skill in the art. In the depicted embodiment, horizontal extension vector 388 is measured with respect to a center-line target 390 aligned with the center-line of second adjustable support 268, but other embodiments may comprise other configurations without deviating from the teachings disclosed herein. In the depicted embodiment, horizontal extension instrument 384 is configured to be detachably coupled to second adjustable support 268, but in some embodiments may be permanently affixed thereto. In some embodiments, horizontal extension instrument 384 may be a reconfiguration of one or more of measuring instruments 154, such as an alternative mounting angle or an alternative detachably coupling placement with respect to second adjustable support 268. In embodiments wherein horizontal extension instrument 384 may be detachably coupled to primary member 150, service vehicle 110 may further be operable to provide storage for horizontal extension instrument 384, for example during transport of the mobile calibration apparatus.

Figure 4:
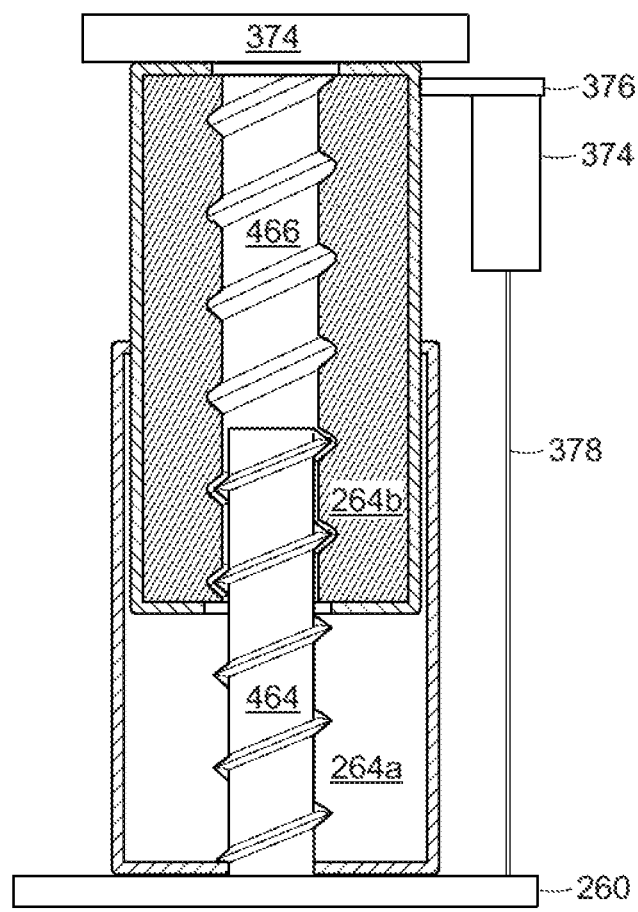
FIG. 4 is a diagrammatic illustration of a vertical-extension support of a primary member of a mobile calibration apparatus.

FIG. 4 depicts a diagrammatic illustration of one embodiment of first adjustable support 264. In the depicted embodiment, lower segment 264*a* comprises a vertical threaded cavity 464. Upper segment 264*b* comprises a vertical threaded rod 466 matching the vertical threaded cavity 464 such that, when rotated, vertical threaded rod 466 causes segment 264*b* to extend in a telescoping motion away from or toward vertical threaded cavity 464, and thus with respect to lower segment 264*a*. Vertical threaded rod 466 is operably coupled to vertical adjustment mechanism 364. Advantageously, embodiments of vertical adjustment mechanism 364 comprising an electric motor may traverse finer threads more quickly than a manual mechanism, and thus a more precise degree of extension is achieved without a substantial increase in time to adjust the degree of extension. In some embodiments, first adjustable support 264 may be comprised of a greater plurality of segments without deviating from the teachings herein.

FIG. 4 also shows a contemplated alternative placement of vertical measurement instrument 374 and vertical instrument mount 376 in relation to the first adjustable support 264.

Figure 5:
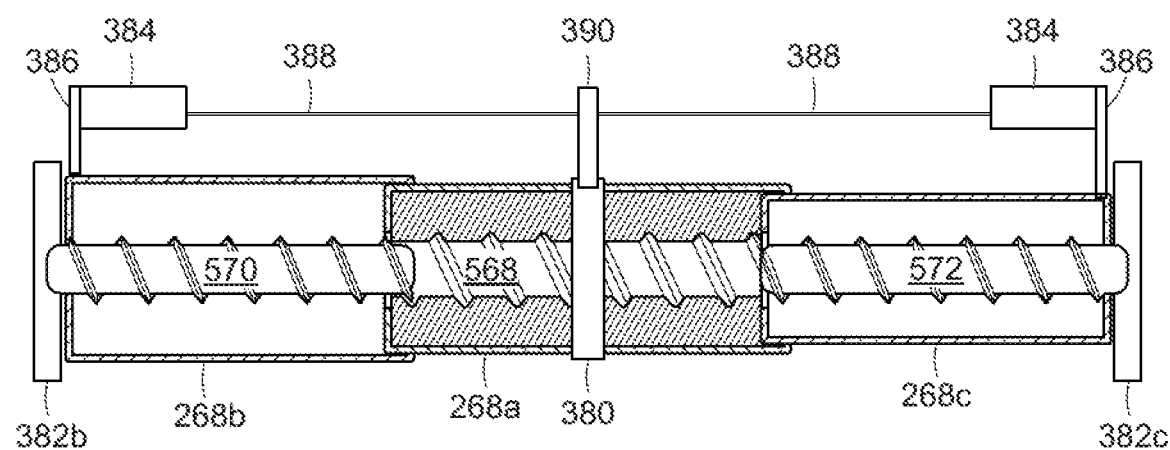
FIG. 5 is a diagrammatic illustration of a horizontal-extension support of a primary member of a mobile calibration apparatus.

FIG. 5 depicts a diagrammatic illustration of one embodiment of second adjustable support 268. Center segment 268*a* comprises a horizontal threaded cavity 568. Left-hand segment 268*b* comprises a first horizontal threaded rod 570. Right-hand segment 268*c* comprises a second horizontal threaded rod 572. Horizontal adjustment mechanism 382 is operably coupled to the first horizontal threaded rod 570 and the second horizontal threaded rod 572. Horizontal adjustment mechanism 382 is depicted herein as being comprised of two elements 382*b* and 382*c*, though in other embodiments horizontal adjustment mechanism 382 may be comprised off single element or a larger plurality of elements. Horizontal adjustment mechanism 382*b* is operable to rotate the first horizontal threaded rod 570. Rotation of first horizontal threaded rod 570 creates interaction with horizontal threaded cavity 568 that causes left-hand segment 268*b* to extend away from or toward horizontal threaded cavity 568, and thus center segment 268*a*. Horizontal adjustment mechanism 382*c* is operable to rotate the second horizontal threaded rod 572. Rotation of second horizontal threaded rod 572 creates interaction with horizontal threaded cavity 568 that causes right-hand segment 268*c* to extend away from or toward horizontal threaded cavity 568, and thus center segment 268*a*. Advantageously, embodiments of horizontal adjustment mechanism 368 comprising an electric motor may traverse finer threads more quickly than a manual mechanism, and thus a more precise degree of extension is achieved without a substantial increase in time to adjust the degree of extension. In the depicted embodiment, horizontal adjustment mechanisms 382*b* and 382*e* may be operated and controlled in tandem, but other embodiments may comprise a number of horizontal adjustment mechanisms that may be operated and controlled individually. In some embodiments, second adjustable support 264 may be comprised of only segments or a larger plurality of segments without deviating from the teachings herein.

Figure 6:
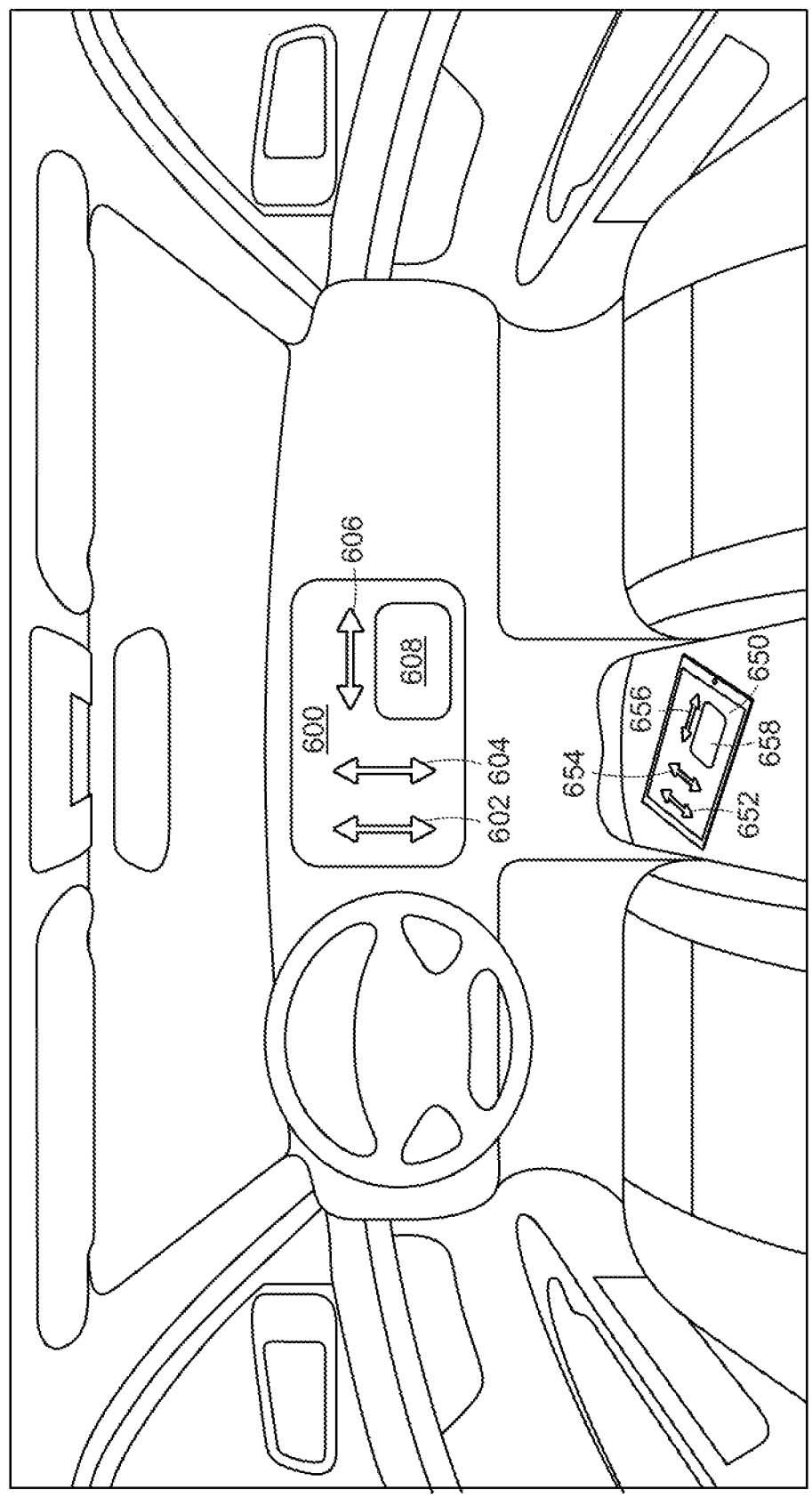
FIG. 6 is an interior view of a console of a vehicle having controls for controlling a mobile calibration apparatus.

In some embodiments, adjustable components of the calibration apparatus may be controlled electrically from a user interface. FIG. 6 depicts embodiments of user interfaces for controlling the calibration apparatus electrically. In one embodiment, service vehicle 110 comprises a vehicle console interface 600 having a display with a number of controls to adjust the components of the calibration apparatus. The depicted controls on vehicle console interface 600 include a stabilizer control 602 for controlling stabilizers 262 (see FIG. 2), a vertical extension control 604 for controlling the extension of first adjustable support 264, and a horizontal extension control 606 for controlling the extension of the second adjustable support 264. Additional, controls or informational displays may be provided in display sub-section 608. In the depicted embodiment, vehicle console interface 600 is a touch-screen display configured to accept user input via direct-touch contact with the display, but other alternative embodiments are known which would not deviate from the teachings herein, such as a hardware panel with input buttons, soft key inputs, voice control input, or any other alternative input configuration known to one of ordinary skill in the art. Control of the calibration apparatus may be accomplished using a hard-wire connection between service vehicle 110 and primary member 150, or using a wireless connection. Wireless connections may include a Bluetooth specification, a Wi-Fi specification, a WLAN specification, radio wave transmission, a Zigbee specification, an infrared transmission, a proprietary protocol, or any other embodiment known to one of ordinary skill in the art. Advantageously, a hard-wired connection between primary member 150 and service vehicle 110 may also provide operability for service vehicle to provide power to the adjustable components of the calibration apparatus. In some embodiments, vehicle console interface 600 may be operable to interface with subject vehicle 100 to control the functions of subject vehicle 100 during sensor calibration.

FIG. 6 also depicts a mobile control device 650, having a display which includes controls of the calibration device. The depicted controls of mobile control device 650 include a stabilizer control 652 for controlling stabilizers 262 (see FIG. 2), a vertical extension control 654 for controlling the extension of first adjustable support 264, and a horizontal extension control 656 for controlling the extension of the second adjustable support 264. Additional controls or informational displays may be provided in display sub-section 658. Mobile control device 650 may be embodied as a portable computing device, a smart phone, a tablet device, a touch-screen display, a specialized portable processing device, or any other alternative configuration known to one of ordinary skill in the art. Mobile control device 650 may be operable for wireless communication with the calibration apparatus using a Bluetooth specification, a Wi-Fi specification, a WLAN specification, radio wave transmission, a Zigbee specification, an infrared transmission, a proprietary protocol, or any other embodiment known to one of ordinary skill in the art. Mobile control device 650 may further be operable for hard-wired communication with the calibration apparatus using a detachable hard-wire connection or a permanent hard-wire connection. In some embodiments, mobile control device 650 may be configured to control the calibration apparatus in tandem with vehicle console display 600, or one device may be configured to operate as a master device that overrides the other if simultaneous control is attempted. In some embodiments, mobile control device 650 may be configured to act as an additional control interface for vehicle control interface 600, with mobile control device 650 having a hard-wired or wireless connection to service vehicle 110 configured to provide interaction with vehicle console interface 600. In some embodiments, mobile control device 650 may be additionally operable to draw power or charge an internal battery using a power source supplied by service vehicle 110. In some embodiments, mobile control device 650 may be operable to interface with subject vehicle 100 to control the functions of subject vehicle 100 during sensor calibration.

The mobile calibration apparatus disclosed herein advantageously may be operated in conditions less ideal than those of a conventional automotive workshop. In some embodiments, hitch mechanism 152 (see FIG. 1) may be configured to permanently affix primary member 150 to service vehicle 110. Referring back to FIG. 1, though hitch mechanism 152 is depicted as being configured to mount the calibration apparatus to the rear of service vehicle 110, but hitch mechanism 152 may be configured to mount to any side of service vehicle 110 without deviating from the teachings herein. In some additional embodiments, primary member 150 may be detachably coupled with service vehicle 110 using hitch mechanism 152 for the purposes of improving mobility of service vehicle 110, for example to improve visibility of the environment while driving or to comply with local laws directed to allowable conditions of a vehicle to be driven on public roads.

Figure 7:
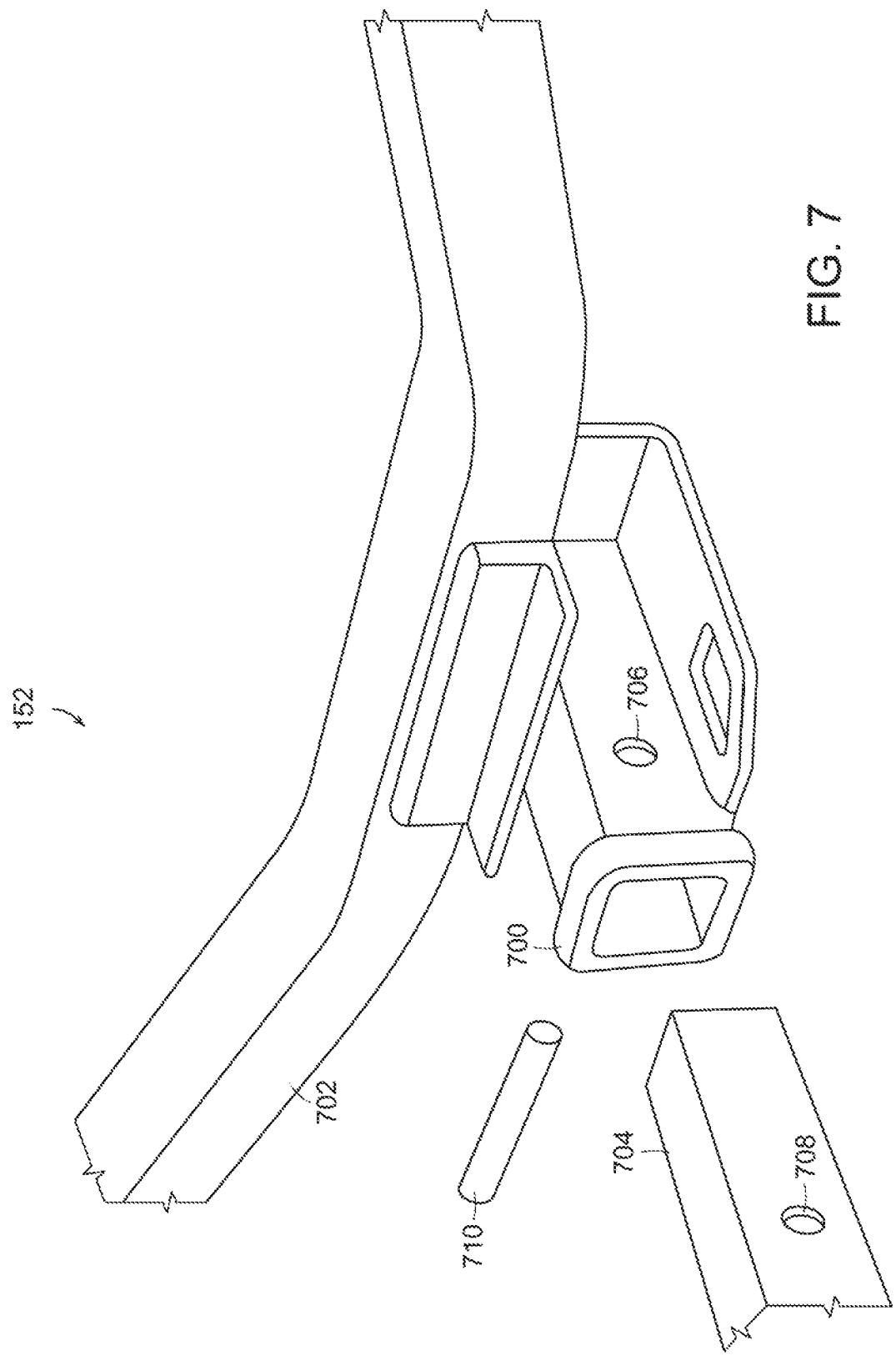
FIG. 7 is a hitching mechanism operable to mount a primary member of a mobile calibration apparatus to a service vehicle of a mobile system.

FIG. 7 presents one particular detachable coupling configuration of hitch mechanism 152. In the depicted embodiment, hitch mechanism 152 comprises a 3-point receiver hitch 702 affixed to the frame of service vehicle 110 (not shown, see FIG. 1) using a 3-point coupling 702. In the depicted embodiment, hitch mechanism 152 further is comprised of a hitch tongue 704 serving as one of the stabilizers 262 of primary member 150 (see FIG. 2). In the depicted embodiment, hitch receiver 700 further comprises a receiver pin thread 706 and hitch tongue 704 further comprises a tongue pin thread 708 to prevent decoupling of the hitch tongue 704 using a pin 710. Pin 710 prevents decoupling of the hitch mechanism 152 along a singular axis. Additional stability for the primary member 150 is achieved utilizing additional stabilizers 262 (not shown, see FIG. 2). In the depicted embodiment, additional stabilizers 262 comprise hydraulic jacks which may be pivoted about the base 260 with respect to the ground surface on which service vehicle 110 rests. Additional stabilizers 262 thus provide additional stability in substantially vertical and rotational directions. Because stabilizers 262 may be positioned at desired angles, the stability of primary member 150 is not dependent upon the flatness or evenness of the ground surface. In the depicted embodiment, hitch mechanism 152 in combination with stabilizers 262 provide sufficient stability that wind conditions cannot shift primary member 150 out of alignment during calibration.

Other embodiments may provide additional features to improve the versatility and mobility of the calibration apparatus. For example, the calibration apparatus may further comprise a canopy member to provide a canopy sufficient to provide shelter to both subject vehicle 100 and service vehicle 110. A canopy member may be embodied as a folding tent structure, a system of tarpaulins with specialized rigging, an electrically-controlled frame having a folding mechanism and sheet elements affixed thereto, or any other alternative embodiments known to one of ordinary skill without deviating from the teachings herein. In some embodiments, the canopy member may advantageously provide overhead shelter and additional wall shelter. In some embodiments, the canopy member may advantageously be folded, collapsed, or otherwise compacted for easier storage or transportation. The shelter provided the canopy member may be operable to shelter subject vehicle 100, service vehicle 110, or both. In the description herein, embodiments having a canopy member are described as an embodiment wherein the canopy member is operable to provide shelter to both subject vehicle 100 and service vehicle 110. Shelter provided by the canopy member may advantageously shield the sensors of subject vehicle 100 from rain or direct sunlight which may corrupt the sensor readings during calibration. In the embodiments depicted herein, a canopy shelter would further advantageously prevent direct sunlight from interfering with the proper operation of optical rangefinder embodiments of measuring instruments 154, vertical extension instrument 374 or horizontal extension instrument 384 (see FIG. 3). In some embodiments, the shelter provided by the canopy member may be sufficient to prevent misalignment of primary member 150 or platform members 170 from In some embodiments, service vehicle 110 is operable to provide storage for the canopy member during transportation or when not in use during calibration.

In some embodiments having a configuration of hitch mechanism 152 operable for detachably mounting primary member 150 to service vehicle 110, alternative configurations may be arranged. For example, in conditions in which service vehicle 110 is too large to provide proper operation in the desired conditions, the calibration apparatus may additionally comprise a remote hitch member detached and independent of service vehicle 110. A remote hitch member provides a smaller mobile frame to support primary member 150, but using the same hitch mechanism 152. Thus the calibration may be performed in environments too small to accommodate the entirety of service vehicle 110, while still providing mobility to primary member 150 using the remote hitch member. In some embodiments, the remote hitch member may be foldable, collapsible, or otherwise compactable in order to improve storage or transportation thereof. In some embodiments, service vehicle 110 may be advantageously operable to store remote hitch member during transport or when remote hitch member is not in use during calibration. In some embodiments, remote hitch member may comprise wheels to improve short-range mobility of the placement of primary member 150 when mounted upon the remote hitch member. In some embodiments, the wheels of the remote hitch member may be locking wheels to prevent misalignment of primary member 150 during calibration.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A sensor calibration apparatus having a primary member comprising:
    a base of the primary member having a number of stabilizing members, at least one stabilizing member comprising a hitch mechanism configured to mount the primary member to a separate support structure;
    a first adjustable support extending from the base in a substantially vertical direction;
    a first adjustment mechanism operably coupled to the first adjustable support and configured to control degree of extension of the first adjustable support from the base in the substantially vertical direction;
    a second adjustable support affixed to the first adjustable support and extending therefrom in a substantially horizontal direction;
    a second adjustment mechanism operably coupled to the second adjustable support and configured to control degree of extension of the second adjustable support from the first adjustable support in the substantially horizontal direction;
    a number of target mounts configured to detachably affix a reflective calibration target to the second adjustment support;
    a number of vertical range finders affixed to the second adjustable support, each of the number of vertical range finders being operable to determine a distance of the extension of the first adjustable support from the base; and
    a number of horizontal range finders affixed to the second adjustable support, each of the number of horizontal range finders being operable to determine a distance of the extension of the second adjustable support from the first adjustable support.

2. The apparatus of claim 1, wherein at least one of the number of stabilizing members comprises an extending foot structure operable to level the apparatus horizontally when connected to the separate support structure.

3. The apparatus of claim 1, wherein the first adjustable support comprises a plurality of segments, wherein a first segment is affixed to the base and comprises a threaded shaft defined within the first segment, a second segment comprises a threaded rod configured to interact with the threaded shaft of the first segment, and the first adjustment mechanism is a rotational mechanism configured to rotate the threaded rod of the second segment within the threaded shaft of the first segment.

4. The apparatus of claim 3, wherein the first adjustment mechanism is configured to be operated by an electric motor.

5. The apparatus of claim 1, further comprising a number of secondary platform members distinct from the primary member, the secondary platform members having height-adjustable foot structures and configured to support the weight of a vehicle having sensors.

6. The apparatus of claim 5, further comprising a number of measuring instruments affixed to the primary member, wherein the number of secondary platform members further comprise a target configured to provide a distance measurement of the secondary platform when targeted by one of the number of measuring instruments.

7. The apparatus of claim 1, wherein the first adjustment mechanism is configured to be operated using a first electric motors and the second adjustment mechanism is configured to be operated using a second electric motor.

8. The apparatus of 7, wherein the first electric motor and the second electric motor are configured to be controlled via a wireless connection with a portable controller device.

9. The apparatus of 7, wherein the hitch mechanism is configured to mount the apparatus to a vehicle, and wherein the first electric motor and the second electric motor are configured to be controlled via an interface disposed within the vehicle.

10. The apparatus of 9, wherein the first electric motor and the second electric motor are configured to draw power from a power source disposed within the vehicle.

11. The apparatus of claim 1, wherein the second adjustable support comprises a plurality of segments, wherein a first segment is affixed to the first adjustable support and comprises a threaded shaft defined within the first segment, a second segment comprises a threaded rod configured to interact with the threaded shaft of the first segment, and the second adjustment mechanism is a rotational mechanism configured to rotate the threaded rod of the second segment within the threaded shaft of the first segment.

12. The apparatus of claim 11, wherein the second adjustment mechanism is configured to be operated by an electric motor.

13. The apparatus of claim 11, wherein the second adjustable support further comprises a third segment comprised of a thread rod configured to interact with the threaded shaft of the first segment, and the apparatus further comprises a third adjustment mechanism operably coupled to the second adjustable support and configured to rotate the threaded rod of the third segment within the threaded shaft of the first segment, the rotation of the third adjustment mechanism being independent of the rotation of the second adjustment mechanism.

14. The apparatus of claim 13, wherein the second adjustment mechanism and the third adjustment mechanism are configured to be operated by an electric motor.

15. A sensor calibration system, the system comprising:
a primary member having a base comprising a number of stabilizing members, at least one stabilizing member comprising a hitch mechanism configured to mount the primary member to a separate support structure, a first adjustable support extending from the base in a substantially vertical direction, a first adjustment mechanism operably coupled to the first adjustable support and configured to control degree of extension of the first adjustable support from the base in the substantially vertical direction, a second adjustable support affixed to the first adjustable support and extending therefrom in a substantially horizontal direction, a second adjustment mechanism operably coupled to the second adjustable support and configured to control degree of extension of the second adjustable support from the first adjustable support in the substantially horizontal direction, a number of target mounts configured to detachably affix a reflective calibration target to the second adjustment support, a first number of range-finder mounts operable to detachably affix a first range finder to the first adjustable support, and a second number of range-finder mounts operable to detachably affix a second range finder to the second adjustable support;
a number of targets configured to be detachably affixed to the target mounts of the primary member;
a first range finder configured to be detachably affixed to the first range-finder mount;
a second range finder configured to be detachably affixed to the second rage-finder mounts; and
a number of platform members distinct from the primary structure, the platform structures having a platform surface, height-adjustable foot structures operable to adjust the height of the platform surface.

16. The system of claim 15, further comprising a vehicle having a 3-point receiver hitch, the primary member being mounted to the vehicle using the hitch mechanism and the 3-point receiver hitch.

17. The system of claim 16, wherein at least one of the first adjustment mechanism and the second adjustment mechanism is controlled using a number of electric motors.

18. The system of claim 17, wherein the number of electric motors are operable to draw power from a power source disposed within the vehicle.

19. A mobile sensor calibration system comprising:
a vehicle having an electric power source disposed therein, the vehicle further defining a storage compartment,
a receiver hitch affixed to a frame of the vehicle;
a primary alignment member having a base, a number of stabilizers wherein one of the number of stabilizers comprises a hitch tongue configured to detachably couple the primary alignment member to the receiver hitch, the primary alignment member further having a first adjustable support extending from the base in a substantially vertical direction, the primary alignment member further having a second adjustable support extending from the first adjustable support in a substantially horizontal direction, the second adjustable support comprising a number of target mounts and a number of ranger-finder mounts, the primary alignment member further having a first adjustment mechanism for controlling degree of extension of the first adjustable support, the primary alignment member further having a second adjustment mechanism for controlling degree of extension of the second adjustable support;
a number of targets configured to be detachably affixed to the target mounts of the primary alignment member, the targets operable to be stored within the storage compartment of the vehicle when detached from the primary alignment member;
a number of range finders configured to be detachably affixed to the range-finder mounts of the primary alignment member, the range finders operable to be stored within the storage compartment of the vehicle when detached from the primary member;
a number of platform members distinct from the primary alignment member, the platform members having a platform surface, a target, and height-adjustable foot structures operable to adjust the height of the platform surface, the platform members operable to be stored within the storage compartment of the vehicle; and
a controller disposed within the vehicle, the controller having an interface configured to permit a user to control the degree of extension of the first adjustable support and the second adjustable support.

* * * * *